June 2, 1936.  E. J. WEIBLE  2,043,136
VARIABLE PITCH WINDMILL
Filed July 8, 1935
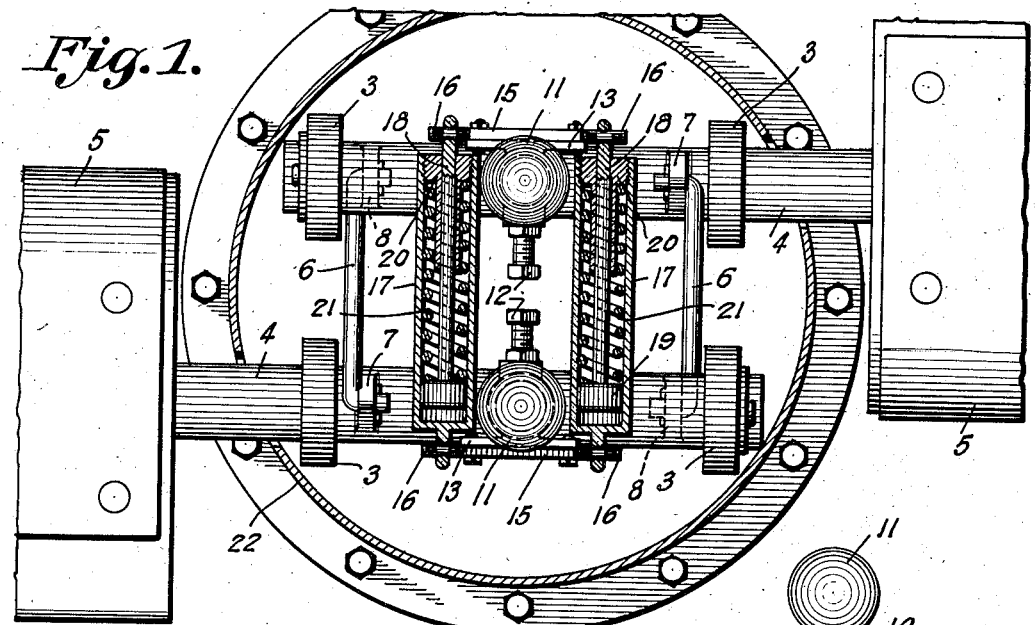
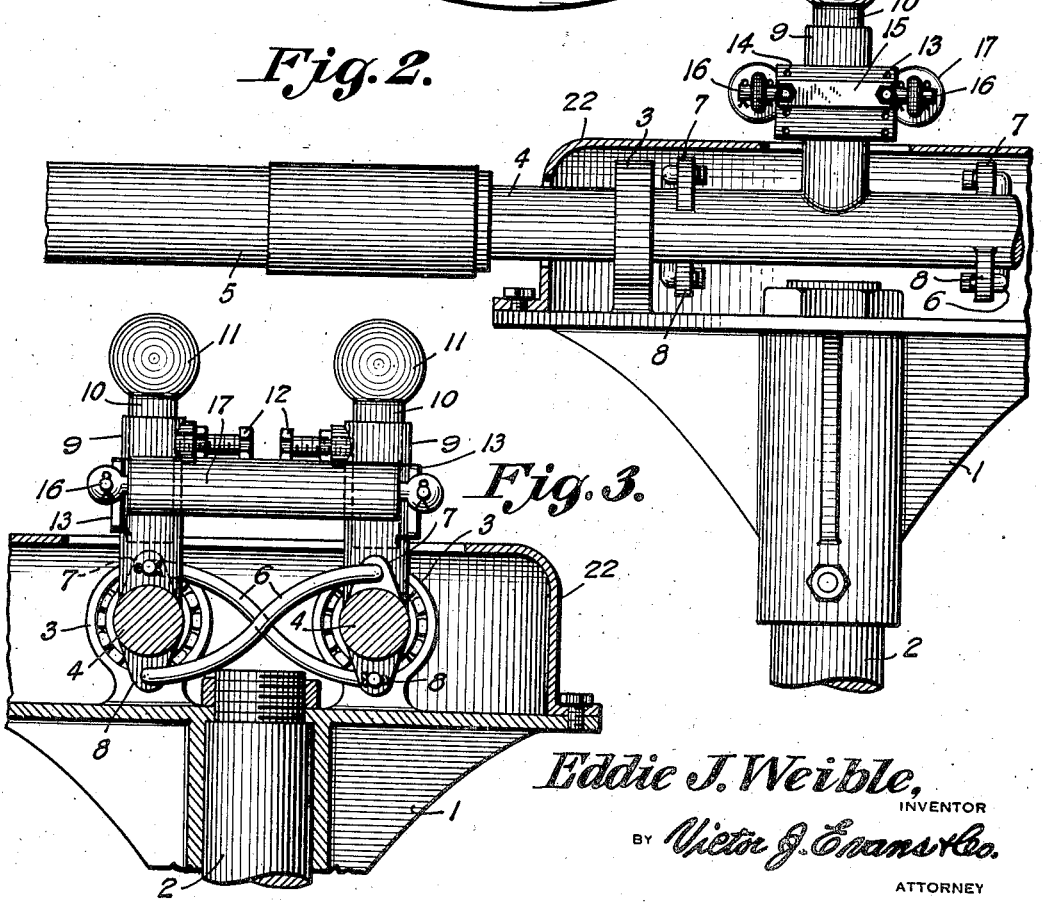
Eddie J. Weible,
INVENTOR
BY Victor J. Evans & Co.
ATTORNEY Patented June 2, 1936

2,043,136

UNITED STATES PATENT OFFICE 2,043,136

VARIABLE PITCH WINDMILL

Eddie J. Weible, Hillsboro, N. Dak.

Application July 8, 1935, Serial No. 30,357

1 Claim. (Cl. 170—68)

This invention relates to windmills for aeroplane use and has for the primary object the provision of a device of this character which is especially adapted for driving an aeroplane electrical generator by wind currents developed both naturally and by the flight of the aeroplane wherein the velocity of the wind currents vary and the present device is so constructed as to maintain the speed of rotation of the generator constant and thereby eliminate variable output of electricity from the generator.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a windmill constructed in accordance with my invention.

Figure 2 is a fragmentary horizontal sectional view illustrating the same.

Figure 3 is a fragmentary transverse sectional view showing the connection between the blade shafts and the governor weights associated with said shafts.

Referring in detail to the drawing, the numeral 1 indicates a hub constructed to be suitably secured to an armature shaft 2 of an electric generator (not shown). Pairs of journals or bearings 3 of any suitable type are carried by the hub 1 and have journaled therein oppositely extending blade shafts 4 to which are secured blades 5. The shafts 4 are capable of turning in the bearings 3 to permit the pitch of the blades to be varied and to assure synchronized pitch of the blades, the shafts are connected by links 6, each of which has a compound curve so that one end thereof may be pivoted to a lug 7 at one side of a shaft 4 and the opposite end pivoted to a lug 8 formed on the other shaft and at an opposite side thereof from the lug 7. Therefore, it will be seen that, by referring to Figure 3, the links cross one another and with this arrangement the shafts are caused to turn in unison.

Extending at right angles to the shafts and integral therewith are sleeves 9 in which are adjustably mounted stems 10 carrying at their free ends weights 11. The stems 10 may be adjusted inwardly and outwardly of the sleeves 9 and held in any of their adjusted positions by set bolts 12. The set bolts are opposed to one another and act as stops for the movement of the weights in the direction of each other.

Formed on the sleeves 9 are plate-like brackets 13 each provided at opposite edges thereof with a series of openings 14. Removably and adjustably secured to the brackets 13 are plates 15 carrying at their ends pintles 16. The plates 15 are capable of being adjusted endwise of the sleeves and towards and from the weights 11.

Cylinders 17 are journaled to the pintles 16 of one of the plates 15 and journaled to the pintles 16 of the other plate 15 are stems 18 of plungers 19 slidably received in the cylinders. Bushings 20 are threaded into the cylinders and have the stems 18 slidable therethrough and provide seats for coil springs 21 which also bear against the heads of the plungers 19. The springs, plungers and cylinders cooperate with the weights 11 in forming a governor mechanism adapted for automatically varying the pitch of the blades 5 in accordance with the speed of rotation of the device. Variable wind currents of different velocities act to rotate the windmill at variable speeds and the governor mechanism automatically acts on the blades 5 for maintaining the speed of rotation of the device constant so that an extremely satisfactory medium is provided for driving an electric generator of an aeroplane at a constant speed of rotation so that a constant output of electricity may be had from the generator.

A casing 22 is removably secured to the hub 1 and encloses the journaled ends of the blade shafts and a portion of the governor mechanism while other portions of said governor mechanism are arranged exteriorly of said casing.

Having described the invention, I claim:

A windmill comprising a hub, blade shafts journaled to the hub in parallel relationship and on opposite sides of the hub shaft, links pivotally connected to said shafts and each having a compound curve and crossing one another to cause said shafts to turn in unison, blades secured to said shafts and said shafts, sleeves integral with said shafts and extending at right angles thereto, weights slidably received by said sleeves and adjustable endwise thereof, means for adjustably securing said weights to said sleeves and acting as stops for limiting the movement of the weights towards each other, cylinders adjustably and pivotally connected to one of the sleeves, plungers pivotally and adjustably connected to the other sleeve and slidably received in the cylinders, and coil springs interposed between the plungers and the cylinders for cooperating with the weights in forming a governor mechanism to vary the pitch of the blades in accordance with the speed of rotation of the latter.

EDDIE J. WEIBLE.